United States Patent [19]
Martensson

[11] Patent Number: 5,553,125
[45] Date of Patent: Sep. 3, 1996

[54] TELEPHONE APPARATUS WITH CALLING LINE IDENTIFICATION

[75] Inventor: N. E. Martensson, Woking, England

[73] Assignee: Nokia Mobile Phones (U.K.) Limited, United Kingdom

[21] Appl. No.: 270,232

[22] Filed: Jul. 1, 1994

Related U.S. Application Data

[63] Continuation of Ser. No. 84,076, Jun. 28, 1993, abandoned, which is a continuation-in-part of Ser. No. 816,209, Jan. 2, 1992, abandoned.

[30] Foreign Application Priority Data

Jan. 11, 1991 [GB] United Kingdom ................. 9100611

[51] Int. Cl.$^6$ .................. H04M 15/00; H04M 1/56; H04M 1/66; H04M 11/00
[52] U.S. Cl. .................. 379/140; 379/142; 379/58; 379/61; 379/199
[58] Field of Search ................. 379/58, 61, 63, 379/130, 131, 103, 106, 107, 190, 191, 192, 199, 376; 450/33.1, 33.2

[56] References Cited

U.S. PATENT DOCUMENTS

| | | | |
|---|---|---|---|
| 4,278,844 | 7/1981 | Jones | 179/18 B |
| 4,873,719 | 10/1989 | Reese | 379/215 |
| 4,924,496 | 5/1990 | Figa et al. | 379/142 |
| 4,998,291 | 5/1991 | Marui et al. | 379/58 X |
| 5,029,196 | 7/1991 | Morganstein | 379/210 X |

FOREIGN PATENT DOCUMENTS

| | | |
|---|---|---|
| 0330856 | 9/1989 | European Pat. Off. . |
| 0347155 | 12/1989 | European Pat. Off. . |
| 0355777 | 2/1990 | European Pat. Off. . |
| 2933477 | 4/1981 | Germany . |
| 2173069 | 10/1986 | United Kingdom . |

OTHER PUBLICATIONS

European Patent Office—Patent Abstracts of Japan—PUB. #JP62281552—Pub. Date Jul. 12, 1987—Telephone Set For Selectively Rejecting Incoming Call.
Patent Abstracts of Japan, vol. 9, No. 310, Dec. 6, 1985, Nippon Denshin Denwakosha, Limited Incoming System.

*Primary Examiner*—Wellington Chin
*Assistant Examiner*—Paul Loomis
*Attorney, Agent, or Firm*—Perman & Green

[57] ABSTRACT

A portable cellular telephone capable of recognizing a Calling Line Identification (CLI) signal. The telephone comprises a memory in which can be stored telephone numbers together with an associated operating instruction. For example the instruction may be for the telephone to respond with a "BUSY LINE" signal. When a call is received which includes a CLI signal the memory is searched to find a number corresponding to the CLI. If a match is found the normal operating sequence is interrupted to carry out the associated instruction. Hence the telephone can respond with a "BUSY LINE" signal for calls originating from selected telephone numbers, providing a call screening facility.

25 Claims, 4 Drawing Sheets

TELEPHONE APPARATUS WITH CALLING LINE IDENTIFICATION

This is a continuation of application Ser. No. 08/084,076 filed on Jun. 28, 1993 which is a continuation in part of Ser. No. 07/816,209 filed on Jan. 2, 1992 both abandoned.

This invention relates to a telephone apparatus adapted to respond to a signal conveying a number identifying the source of an incoming telephone call. Specifically the identifying number may be the telephone number of the telephone making the incoming call.

BACKGROUND OF THE INVENTION

It is known, for example in the context of cellular radio telephone systems, for the subscriber number of the telephone from which a call is originated to be transmitted in binary code to the telephone receiving the call. This is known in the art as Calling Line Identification (CLI).

Prior art telephones have been adapted to respond to CLI signals and have been provided with a facility for displaying the telephone numbers of incoming calls. Hence the user can see the telephone number before answering the call and so the user can choose whether or not to answer the call. However, if the user chooses not to answer, the telephone will ring for as long as the caller persists with the call, and of course the caller will be aware that he has established a line and that the call has not been answered. A so-called 'call-in-absence' memory has also been provided for storing the telephone numbers of incoming calls which have not been answered within a predetermined period of time. The stored numbers can be recalled at a later time so that the user has a record of calls received but not answered.

GB-A-2014825 discloses a telephone apparatus in which the number of a caller is stored in a memory and can be recalled at a later stage if the call is not answered initially.

SUMMARY OF THE INVENTION

According to the present invention there is provided a telephone apparatus comprising means for responding to a signal conveying a number identifying the source of an incoming telephone call, memory means having a plurality of numeric fields for storing numbers in encoded form, each numeric field having an associated field for storing in encoded form an instruction relating to the operation of said telephone apparatus, means for selecting the numeric field containing the encoded number corresponding to the number identifying the source of the incoming call, and control circuitry comprising means for responding to the instruction stored in the associated field and thereby modifying the operation of said telephone apparatus. The present invention uses a common abbreviated dialing memory (ADM) both for speed dialing and for call screening.

In the present specification the term 'field' relates to a portion of memory intended for storing a specific item of data of a given type such as a telephone number (numeric characters only) or a name (alphabet or alphanumeric characters). A 'record' comprises a collection of individual fields linked by a common feature, e.g. all items of data (fields) relating to the same telephone number.

A telephone apparatus in accordance with the invention has the advantage that calls can be selectively screened, and the subsequent operation of the telephone modified in a predetermined manner depending on the identity of the incoming call. Thus the telephone may respond in one particular way for one telephone number and in a different way for a second telephone number while operation may proceed as normal for calls from other telephone numbers.

Specifically, the instruction stored in the field associated with the selected numeric field may prevent the incoming call from being completed, e.g. by causing the telephone to respond with a signal indicating that the line is busy (engaged). Hence the telephone will not ring and the user will not be aware of the incoming call. Moreover the caller will not be under the impression that his calls are going unanswered, but that the telephone he is calling is in use.

Preferably means are provided for registering the respective number of calls received from identifying numbers corresponding to the encoded numbers stored in the numeric fields and, also the display means may be adapted to display the number of calls received from a selected number stored in encoded form in the numeric fields. Thus the user can see not only the source of any incoming call, but also how many times a call has been received from a particular telephone number thus indicating how persistent the caller has been.

BRIEF DESCRIPTION OF THE DRAWINGS

An embodiment of the invention will now be described, by way of example, with reference to the accompanying drawings, in which.

DETAILED DESCRIPTION OF THE INVENTION

Figure 1:
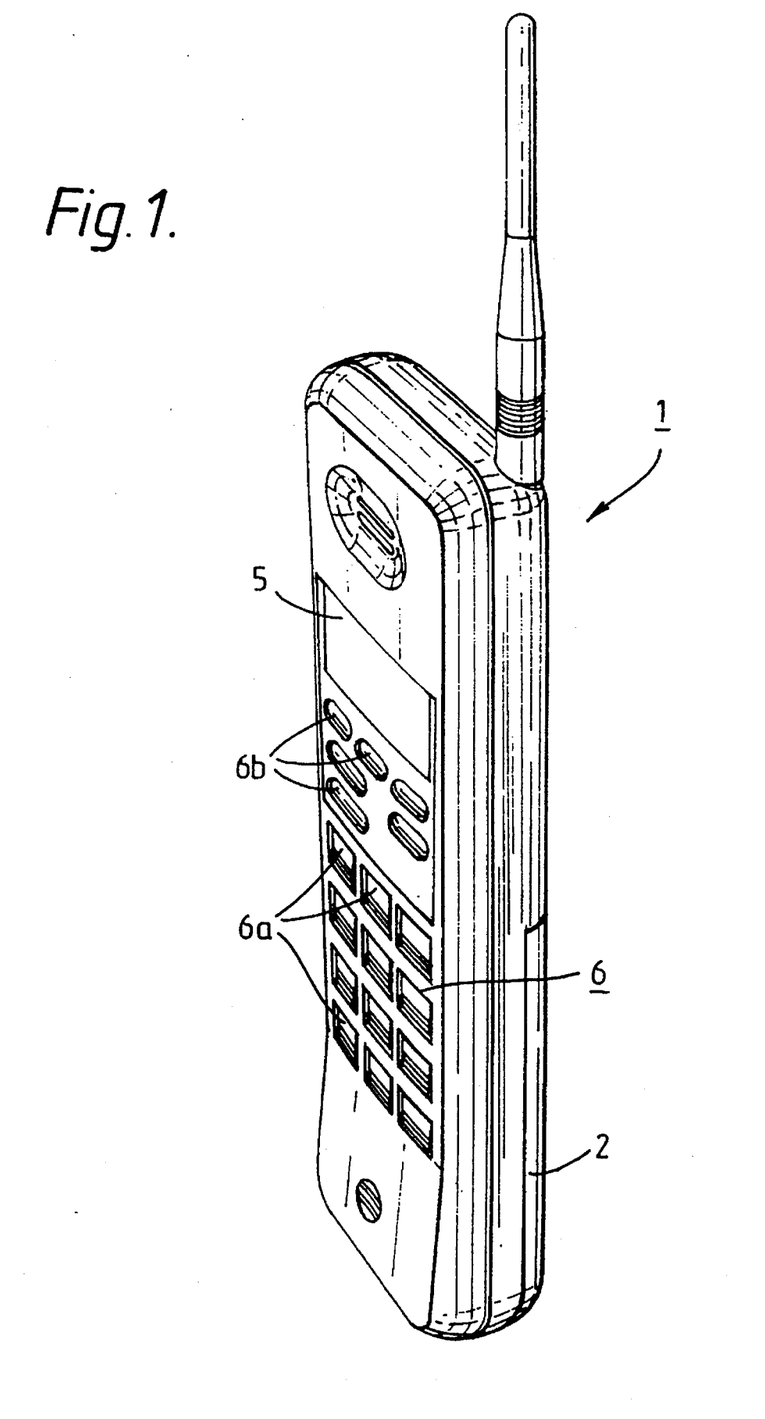
FIG. 1 is a perspective view of a portable cellular telephone in accordance with the invention.

The telephone apparatus shown in FIG. 1 is a portable cellular telephone 1 powered by a rechargeable battery pack 2. The telephone 1 includes a transceiver and all the other features conventionally found in a cellular telephone, including a dialer or dialing means 50 as shown schematically in FIG. 2. Since these aspects of the telephone are not directly relevant to the instant invention no further details will be given here, except to say that a microprocessor 4 (see FIG. 2) is employed to control all the basic functions of the telephone 1 and to control the keypad and display functions. Alternatively, however, the telephone functions may be controlled by a master microcomputer, while the keypad and display functions are under the control of a separate slave microcomputer coupled to communicate with the master microcomputer. Additionally an abbreviated dialing memory (ADM) 100 is provided for storing subscriber telephone numbers, as described in more detail below. The dialer 50 is one of the telephone functions and is connected to the ADM 100 through the microprocessor 4.

The user-interface of telephone 1 comprises a display, e.g. a liquid crystal display 5, itself well-known in the art and a keypad 6 on the front of the telephone 1. The display is coupled to and regulated by the microprocessor 4 in the usual manner. The keypad 6 essentially comprises two main sets of keys, namely alphanumeric keys 6a associated with alphanumeric data especially for dialing telephone numbers, but also for entering alphanumeric data into the telephone number store 100; and a set of function keys 6b for enabling various predetermined functions or operations.

The keys 6a are arranged in four rows of three keys each. As is conventional for the numeric key layout of a telephone, the top row comprises keys for numbers 1, 2 and 3 respectively, the second row down for numbers 4, 5 and 6 respectively, the next row down for numbers 7, 8 and 9 respectively, and the bottom row for *, 0 and # respectively. The keys 6a are also associated with alphabet information, as again is quite conventional. The alphabetic rather than numeric data is selected for example by preceding the alphanumeric keystroke with another predetermined keystroke or set of keystrokes, specifically using the function keys in the data entry mode as discussed in more detail below.

As is usual in cellular telephones, the keys 6b include a "SEND" and "END" key for respectively initiating and terminating a telephone call. Another key, specifically located in the top left-hand corner is an "ON/OFF" key for turning the telephone on and off, i.e. by connecting and disconnecting the battery pack power supply. Another of the function keys may be a menu or function key labeled, for example, "MENU" or "FUNCTION" or with a suitable abbreviation thereof. Depression of this key enables a variety of pre-set menus, the related instructions of which are stored in memory, to be viewed and selectively enabled. The various menus are selected by depressing the appropriate alphanumeric keys after depressing the "MENU" or "FUNCTION" key. The relevant menu is shown to the user in words or abbreviations on the display panel 5. For example, the user may be able to select the ringing tone by appropriate menu selection.

Figure 3:
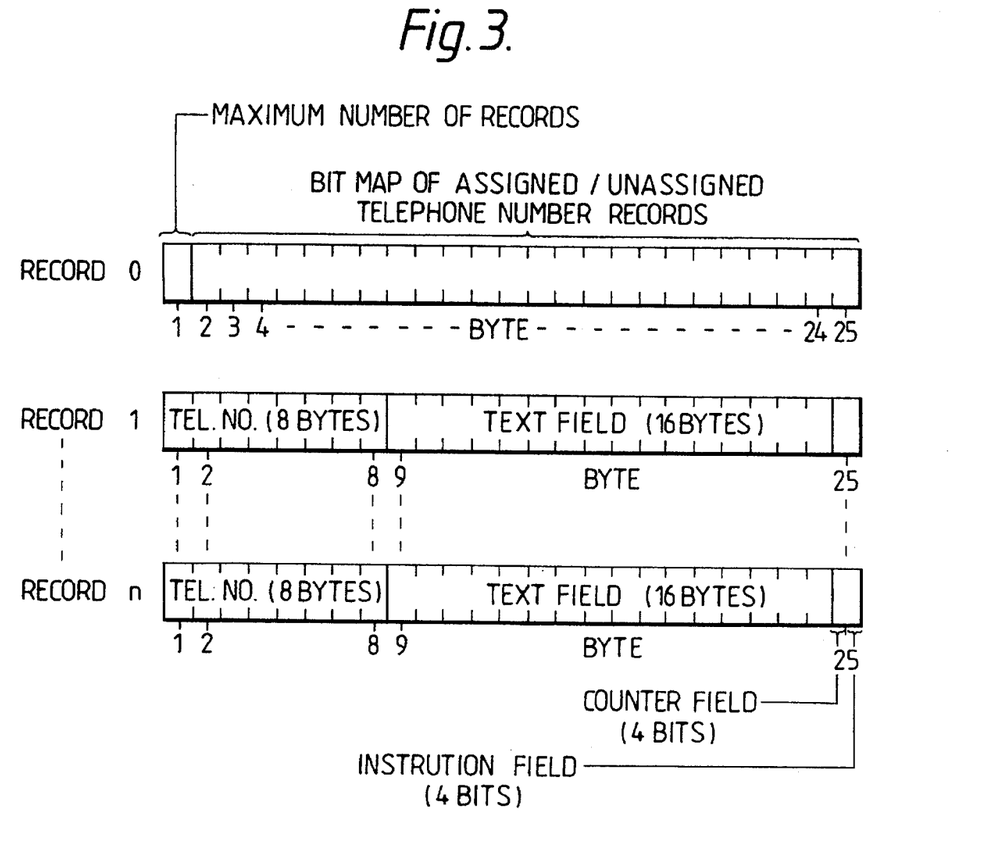
FIG. 3 is a schematic diagram showing the structure and organization of the telephone number store of the telephone in FIG. 2.

The organisation of the abbreviated dialing memory, suitably an EEPROM, constituting the telephone number store 100 will now be described with reference to FIG. 3.

The telephone number store comprises n+1 records, each record having a length of 25 bytes (200 bits). Record 0 is merely an information record and contains information on the size and allocation of the telephone number store. This record is the first in the memory 100 and constitutes record number 0, i.e. abbreviated subscriber number 0. The header, like the n other records, has a length of 25 bytes and is structured as follows. The first byte is used to store the maximum number of records in the telephone number store, and the remaining 24 bytes are used as a bit map to indicate unassigned and assigned records. For example a binary "1" indicates an unassigned record and binary "0" indicates an assigned record. To this end the first telephone number record (Record 1) is represented by the most significant bit (bit 8) in byte 2 (i.e. abbreviated subscriber number 1), whilst the last subscriber number record (maximum 192) is represented by the least significant bit (bit 1) in byte 25 of the header.

A telephone number stored at a predetermined location of the ADM 100 can be called simply by keying the two-digit location and then pressing the 'SEND' key. For example, pressing the key '1', followed by the key '2', followed by the key 'SEND' will initiate a call to the telephone number stored at memory location 12. The call is dialed by the dialing means 50 under the control of the microprocessor 4. The ADM 100 may be programmed by the user for storing frequently used numbers at chosen memory locations. Only three keystrokes are required to initiate a call to any of the telephone numbers stored in the ADM 100. Thus, the telephone 1 includes a speed dialing function allowing the user to call a telephone number stored in a predetermined location of the ADM using a minimum number of keystrokes.

The n subscriber number records each consist of a numeric field 8 bytes long for storing the directory number; a text field, which is 16 bytes long, for storing any accompanying optional text, such as the name of the subscriber; a counter field 4 bits (½ byte) long; and an instruction field also 4 bits (½ byte) long.

Figure 4:
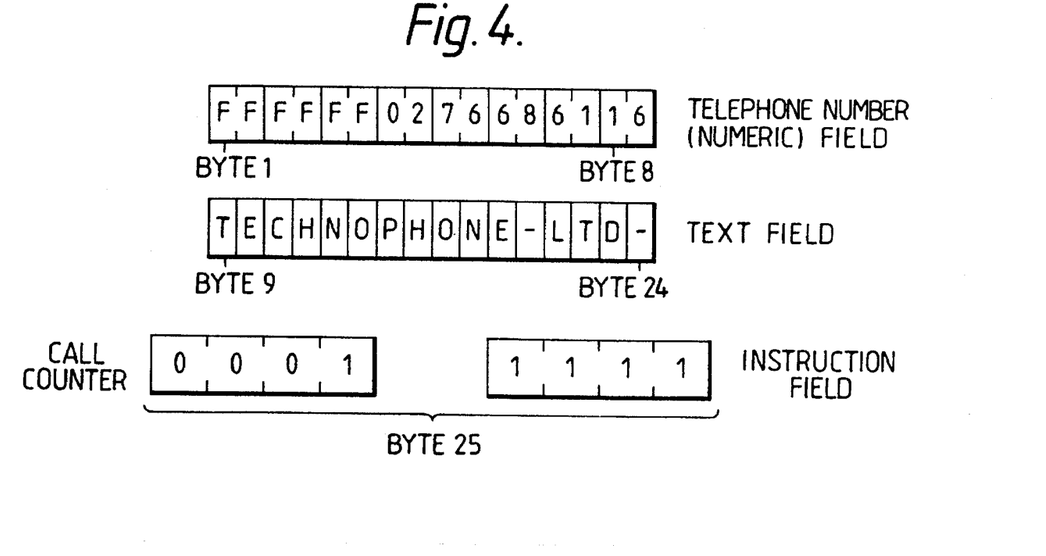
FIG. 4 is a schematic diagram of one of the records in the telephone number store in FIG. 3.

The subscriber number is stored right-justified in the "numeric" field (bytes 1 to 8) and filled to the left with "F" (in hexadecimal), as shown in FIG. 4 for the telephone number 0276 686116. In the case of an empty or deleted subscriber number record, the numeric field (bytes 1 to 8) is filled with F's (hexadecimal).

The text is stored left-justified in the text field (bytes 9 to 24) and filled to the right with spaces, ASCII code "20" (hexadecimal), as shown in FIG. 4 for the words "TECHNOPHONE LTD". In the case of an empty or deleted record, the text field (bytes 9 to 24) is filled with ASCII code spaces "20" (hexadecimal).

The counter field (the four most significant bits of byte 25) stores the number of times a call has been received from the telephone number contained in that record. So, for example, as shown in FIG. 4 a call has been received from the telephone number 0276 686116 once before.

The instruction field (the four least significant bits of byte 25) are available for storing special instructions to modify the manual operation of the telephone. If this field is empty (0000) the operation of the telephone will proceed uninterrupted in the normal manner. However, special instructions may be programmed into this field by the user from the keyboard. For example, in FIG. 4 the code 1111 is used as a "TELEPHONE BUSY" instruction which can be used to block calls from selected telephone numbers, as described in more detail below.

Figure 2:
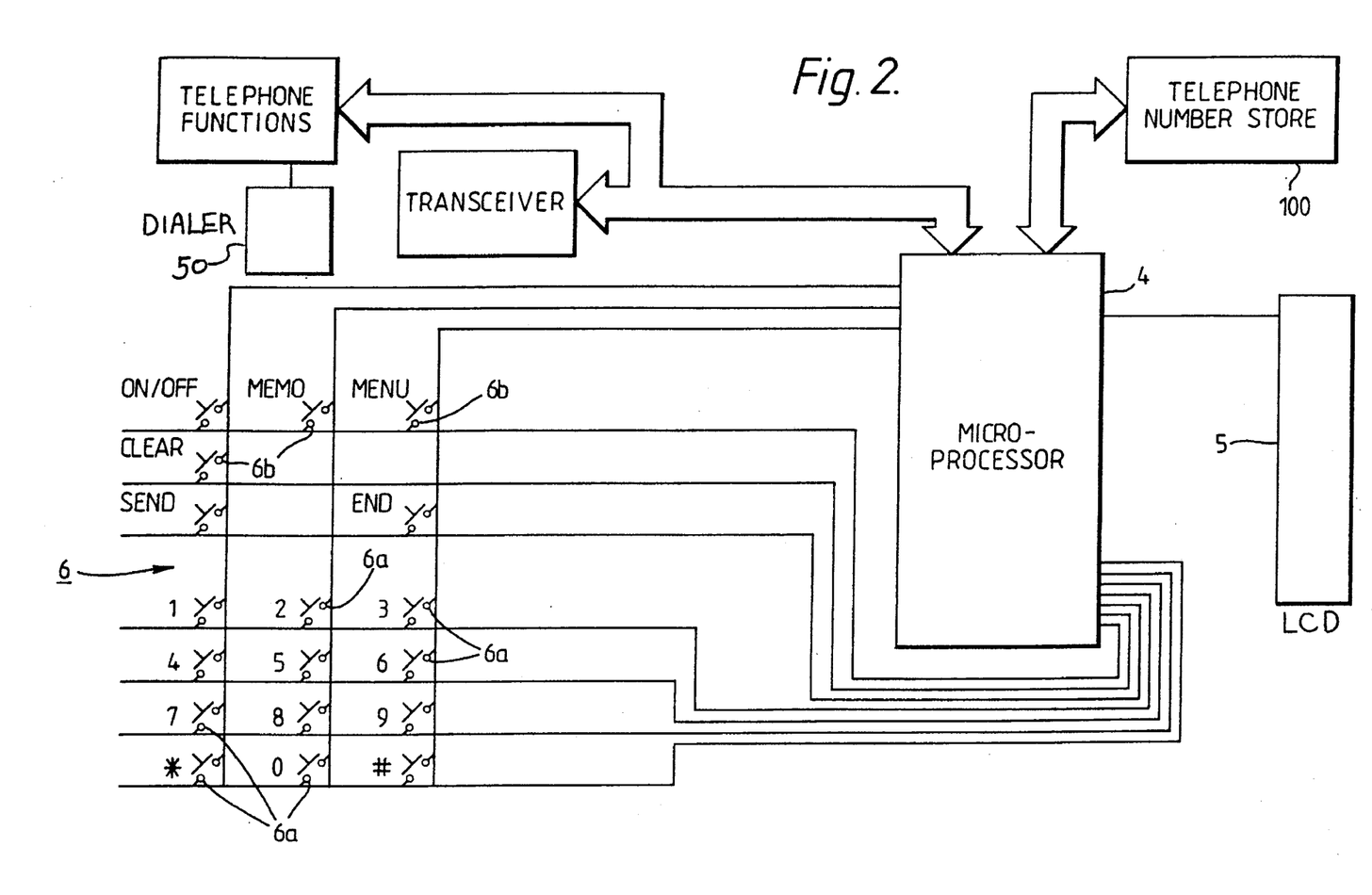
FIG. 2 is a schematic diagram of the main features in the telephone of FIG. 1.
Figure 5:
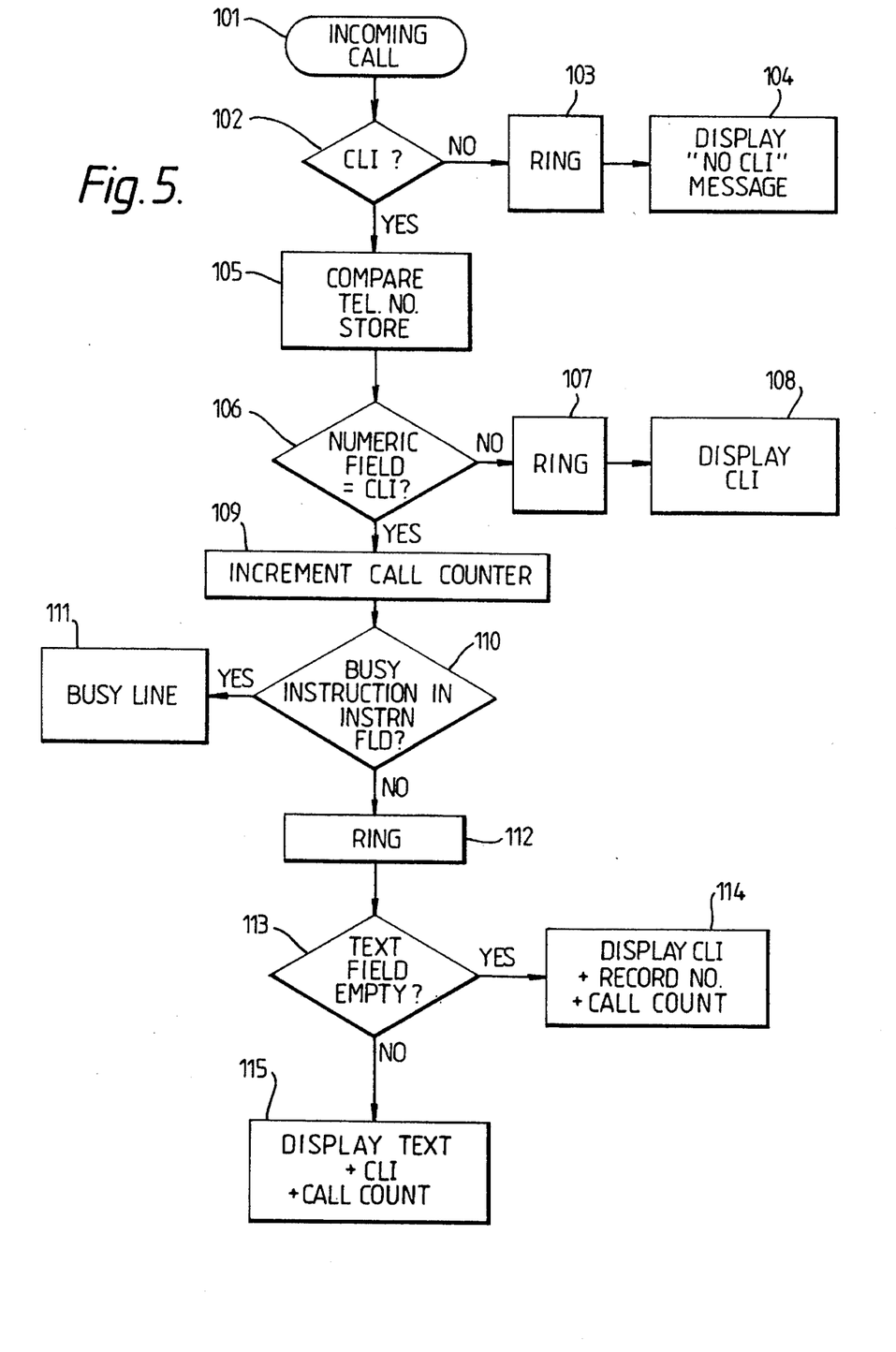
FIG. 5 is a flowchart depicting a set of steps, which may be used by the microcomputer in the telephone in FIG. 2 insofar as implementation of the telephone number store is concerned.

FIG. 5 is a flowchart which may be used to implement the operation of the microprocessor 4 of FIG. 2 insofar as use of the telephone number store 100 is concerned. The flowchart begins at block 101 when the portable telephone receives an incoming call. At block 102 the telephone establishes the telephone number of the caller if a calling line identification (CLI) signal is present. If there is no CLI signal the flow proceeds to block 103 where the telephone is rung and the call will proceed in the conventional manner. Also, as indicated at block 104, the telephone may display a message such as "NO CLI" to indicate that no CLI information is available.

On the other hand, if a CLI signal is present, the telephone number will be established in known manner and the flow will proceed from block 102 to block 105. The telephone numbers stored in the numeric fields of the telephone number store 100 are compared with the CLI number. If none of the stored numbers match the CLI number, see block 106, the flow proceeds to block 107. The telephone is rung and the CLI number is displayed on the display, as illustrated at block 108. Additionally a message such as "NOT IN MEMORY" may be displayed to indicate to the user that the number of the incoming calls is not stored in memory 100.

The CLI number may remain on the display for reference purposes even after the call has been answered and the user may have the opportunity to permanently transfer the displayed number into the telephone number store 100 while the call is in progress. To this end, e.g. by pressing any of the alphanumeric keys 6a, the message on the display changes, for example to "STORE?". At this point the user can confirm that he wishes to store the displayed number by pressing a "STORE" key disposed among the keys 6b. In response the display 5 will show the first available record or memory location. The user may store the number at that or indeed at any other available location of his choice, and also store text to accompany the telephone number, e.g. the caller's name, in accordance with the general procedure for entering data as discussed in greater detail below. If the user does not press the "STORE" key while the "STORE?" message is displayed the CLI number will not be transferred into the telephone number store 100.

On the other hand, if one of the records in the telephone number store 100 is found at block 106 to contain in its numeric field a number corresponding to the CLI, then the counter field of that record will be incremented by one unit as shown at block 109. Thus if the current state of the call counter was 0001 for the selected record as shown in FIG. 4, the counter would be incremented to 0010.

Flow then proceeds to block 110 at which a check is made on the state of the instruction field. If this contains a "BUSY SIGNAL" instruction, e.g. 1111, then the telephone will respond with a busy (engaged) signal, indicated at block 111, as if the telephone were in use. Hence the telephone has a call screening facility, which permits calls from selected telephone numbers to be blocked. The caller will receive a busy or engaged tone.

If, at block 110, the instruction field is found to be empty (contents (0000)), flow will proceed to block 112 and the telephone will be rung. Then, at block 113, a check is made on the text field of the selected record. If the text field does not contain any information (i.e. 16xF(hex)) the telephone number stored in the numeric field of the selected record will be displayed on LCD 5, as indicated at block 114. Also, the record number will be displayed, e.g. in the form "RECORD 99", thus giving the user the maximum amount of information available, in the absence of text, which may help to identify the caller. Additionally the display will show a message indicating the number of times a call has been received from the same telephone number since the call counter was last cleared. This message may, for example, be in the form "CALL COUNT: 2", indicating that this is the second call which has been received from the number displayed. The three items of information, i.e. the CLI number, the record number, and the call count may be displayed simultaneously if the capacity of the display permits, or the various items of information may be displayed sequentially.

If, at block 113, the text field is found to contain information, then the flow proceeds to block 115 and the telephone will display the text stored in encoded form in the text field of the selected record, e.g. "TECHNOPHONE LTD", see FIG. 4. Also, the CLI number viz. 0276 686116 in this case, may be displayed together with the call count, e.g. in the form "CALL COUNT: 2".

All of the information contained in the telephone number store 100 may be entered or programmed by the user from the keypad 6. For example, the store mode may be accessed by pressing the "STORE" key disposed among the keys 6b. The user then enters the desired telephone number up to 16 digits long using the alphanumeric keys 6a. To store the number the "STORE" key is pressed again. In response the display 5 will show the keyed telephone number e.g. 0276 686116, followed by the first available record or memory location, indicated for example as "RECORD 005", assuming records 001 through 004 are already assigned. The record number can be changed at this stage using the "#" key to scroll up to the next location (record 006), or using the "*" key to reach the previous location (record 004). Alternatively, the number keys 6a may be pressed to enter a specific location, e.g. by pressing the key "9" twice for record number 99. The "STORE" key is pressed to store the entered number at the desired location. The display then returns a prompt such as "ENTER NAME". At this stage the alphabet function of the numeric keys 6a is enabled. In general each number key has three sequential alphabetic characters associated therewith. For example the key "8" also has the letters "T" "U" and "V" associated with it. Thus, at the "ENTER NAME" stage, a single press of the numeric key will display the first letter (i.e. "T" for the "8" key), two key presses will display the second letter (i.e. "U" for the "8key"), and three key presses will display the third letter (i.e. "V" for the "8" key). A fourth key press displays the number itself. Further key presses cause this sequence to be repeated. Hence upto 16 alphanumeric characters can be entered into the text field using the alphanumeric keys 6a. The text characters are stored by pressing the "STORE" key once again. If the "STORE" key is pressed before any text has been entered the text field will be left empty. Whether or not text has been entered the last "STORE" keypress will cause the display to show a further prompt such as "BUSY ON", indicating the status of the instruction in the instruction field. This instruction can be toggled between "BUSY ON", and "BUSY OFF" using for example either the "#" or "*" keys. As indicated above, "BUSY OFF" will store 0000 in the instruction field of the selected record permitting calls originating from that number to proceed in the normal manner, whereas "BUSY ON" will store 1111 in the instruction field of the selected record causing a busy or engaged signal whenever a call is received from the subscriber number stored in that record.

Pressing the "STORE" key once more will store all the data which has just been entered in the chosen location and the display will return to its normal state.

The user may at any time review what calls have been received using the "MENU" key. For example by pressing the "MENU" key followed by "5" the display may show the message "REVIEW CALLS". To enable this feature the user presses, for example, the "STORE" (or "ENTER") key. On the other hand by pressing the "#" or "*" keys the message toggles between "REVIEW CALLS" and "ERASE CALL COUNT". If the "STORE" (or "ENTER") key is pressed while the "ERASE CALL COUNT" message is displayed, the counter fields of all records will be reset to zero (0000). On the other hand if the "STORE" (or "ENTER") key is pressed while the "REVIEW CALLS" message is displayed, the display will show the first record which has a non-zero call count, for example: "0276 686116 TECHNOPHONE LTD CALL COUNT: 2". By pressing the "#" key the display will show the next record which has a non-zero call count. Successive records with a non-zero call count can thus be recalled by repeatedly pressing the "#" key. When all records with a non-zero call count have been displayed they will be displayed again in rotation as the "#" key is pressed repeatedly again. The non-zero call-count records can be reviewed in reverse order by pressing the "*" key.

In view of the foregoing it will be evident to a person skilled in the art that various modifications may be made within the scope of the present invention. For example the instruction stored in the instruction field may cause the power to the telephone to be switched off and so prevent the telephone from being used again until a correct code number, i.e. a personal identification number (PIN), has been entered. Alternatively, for example, the instruction may cause the keypad to be disabled until such time as the keypad is re-enabled by entering a predetermined sequence of key strokes. These features give an added degree of security since the telephone can be disabled remotely when the subscriber is away from the telephone and so prevent unauthorized use. As another example, the instruction may cause the call to be redirected to a different number, e.g. to a specified number selected from the telephone number store. This can be done by generating a signal from the transceiver to have the base station redirect the call to a different telephone number or, in a non-cellular system, to have a telephone computer redirect the call to a different extension or a different telephone number.

One of the novel features of the present invention is the combined speed dialing system and call-screening system. Both systems use the same ADM 100 to perform their respective functions. A user of the telephone can store telephone numbers in the ADM 100 and, by use of the appropriate keys on the keypad 6, have the telephone automatically dial a selected one of the numbers. In addition, the call-screening system uses the same ADM 100 to compare stored numbers to the telephone number of an incoming call and perform an associated operation instruction for matched numbers. This makes the telephone less expensive to manufacture (requiring only one telephone number memory store) and, is more convenient to the user because the user only has to enter telephone numbers into one memory; not two. Thus, the user does not have to enter the same telephone number into the telephone twice. Also, the telephone number store may be implemented and configured in any suitable manner and indeed the instruction field may be implemented in a memory physically distinct from the telephone number store. Furthermore, a telephone in accordance with the present invention need not necessarily include a call counter facility, in which case less memory space is required. Also, it is noted that the present invention is applicable to telephone apparatuses other than portable cellular telephones.

Although claims have been formulated in this application to particular combinations of features, it should be understood that the scope of the disclosure of the present application also includes any novel feature or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A radio telephone apparatus comprising:

a transceiver;

means, connected to the transceiver, for responding to a received signal conveying a telephone number identifying a source of an incoming telephone call;

memory means storing a list comprised of a plurality of records each having a plurality of fields, each record having a first field for storing a telephone number and a second field for storing an instruction associated with the telephone number stored in the first field, said instruction relating to the operation of said radio telephone apparatus;

means, responsive to at least one input signal from a user, for selectively accessing one of the stored records of said list and speed dialing the telephone number stored in the first field of the accessed record;

means, coupled to said responding means, for automatically searching said same stored list of records to identify a stored record having a telephone number stored in said first field that matches a received telephone number; and control circuitry comprising means for responding to the instruction stored in the associated second field of an identified stored record for modifying the operation of said radio telephone apparatus in accordance with the instruction.

2. Radio telephone apparatus as claimed in claim 1, wherein the instruction stored in the associated second field prevents the incoming call from being completed locally.

3. Radio telephone apparatus as claimed in claim 2, wherein the instruction stored in the associated second field causes the radio telephone to respond with a signal indicating that the radio telephone apparatus is busy.

4. Radio telephone apparatus as claimed in claim 2, wherein the instruction stored in the associated second field causes operation of the radio telephone to be suspended.

5. Radio telephone apparatus as claimed in claim 2, wherein the instruction stored in the associated second field causes the incoming call to be re-directed to a specified telephone number.

6. Radio telephone apparatus as claimed in claim 5, wherein the specified telephone number is stored in a third field of a record within said memory means.

7. Radio telephone apparatus as claimed in claim 1, further comprising a keypad enabling data to be entered selectively into said records.

8. A radio telephone comprising:

a transceiver;

a memory storing a list comprised of a plurality of records each having a plurality of fields, each record having a first field for storing a telephone number and a second field for storing an instruction associated with the telephone number stored in the first field;

means, responsive to a first input signal generated by a user of said radio telephone, for accessing a specified one of said records of said list and speed dialing the telephone number stored in the first field of the accessed record;

means, coupled to an output of said transceiver, for automatically comparing a received telephone number, that identifies a source of an incoming telephone call, to the telephone numbers stored in the first field of said same list of stored records; and means, upon received telephone number matching a telephone number stored in the first field of one of said stored records, for responding to the instruction in the second field of the record to modify the operation of the radio telephone in accordance with the instruction.

9. A telephone apparatus comprising:

a speed dialing system having a speed dial memory and a dialer, the memory having means for storing a plurality of records each of which is comprised of a stored telephone number capable of being speed-dialed and at least one associated individual operation instruction for each respective one of the stored telephone numbers; and a call-screening system comprising means for automatically comparing an identification number of an incoming call to the telephone numbers stored in the plurality of records of the speed dial memory, said call-screening system being responsive to the identification number of an incoming call matching a telephone number stored in one of said plurality of records for executing the associated individual operation instruction.

10. An apparatus as in claim 9 wherein the operation instruction causes said call-screening system to return a busy signal to a caller.

11. An apparatus as in claim 9 wherein the operation instruction causes said telephone apparatus to be at least partially disabled.

12. An apparatus as in claim 9 wherein the operation instruction generates a signal from a transceiver to have the incoming call redirected to a different telephone number.

13. A telephone comprising:

means for call screening of incoming telephone calls comprising a call screening memory for storing telephone numbers and an associated individual operation instruction for each respective one of the stored telephone numbers and, means for automatically comparing telephone numbers of incoming calls to telephone numbers stored in the call screening memory; and means for speed dialing of telephone numbers comprising means for a user to selectively access one of the telephone numbers stored in the call screening memory through a keypad of the telephone and automatically dial the stored number, wherein the call screening memory is used for both call screening and speed dialing.

14. A telephone as in claim 13 wherein the means for call screening includes means for automatically performing an associated operation instruction for an incoming call having its telephone number stored in the memory.

15. A telephone as in claim 13 wherein the telephone is a radio telephone having a transceiver.

16. A radio telephone having a key pad, a transceiver for bidirectionally coupling the radio telephone through RF links to a second transceiver, and means for alerting a user to an occurrence of an incoming call, said radio telephone comprising:

a memory storing a plurality of records each having a plurality of fields, each record having a first field for storing a telephone number and a second field for storing an instruction associated with the telephone number stored in the first field;

a speed dialing sub-system coupled to said memory and having an input responsive to said key pad for selecting one of said records stored in said memory in accordance with input from said key pad, and for automatically dialing the telephone number stored in said first field of said selected record; and a call screening sub-system coupled to said memory, said call screening sub-system having an input coupled to said transceiver and being responsive to an incoming call that includes a telephone number of the caller for accessing said memory to search said stored records to locate a stored record having a telephone number stored in the first field that matches the telephone number of the caller, said call screening sub-system being responsive to a located stored record that has a telephone number stored in the first field, that matches the telephone number of the caller, and to the associated instruction, for selectively one of: (a) returning a busy indication to said second transceiver; and (b) activating said alerting means to inform the user of the occurrence of the incoming call.

17. A radio telephone as set forth in claim 16, wherein said radio telephone further includes a user display means, and further comprising:

means, responsive to caller's telephone number not being located in one of said stored records, for outputting the caller's telephone number to said user display means and, in response to a signal received from said key pad, for storing the caller's telephone number into a first field of a new record within said memory.

18. A radio telephone having a key pad and a transceiver for bidirectionally coupling the radio telephone through RF links to a second transceiver, said radio telephone comprising:

a memory storing a plurality of records each having a plurality of fields, each record having a first field for storing a telephone number and a second field for storing an instruction associated with the telephone number stored in the first field;

a speed dialing sub-system coupled to said memory and having an input responsive to said key pad for selecting one of said records stored in said memory in accordance with input from said key pad, and for automatically dialing the telephone number stored in said first field of said selected record; and a radio telephone operation sub-system coupled to said memory, said radio telephone operation sub-system having an input coupled to said transceiver and being responsive to an incoming call that includes a telephone number of the caller for accessing said memory to search said stored records to locate a stored record having a telephone number stored in the first field that matches the telephone number of the caller, said radio telephone sub-system being responsive to a located stored record that has a telephone number stored in the first field, that matches the telephone number of the caller, and to the associated instruction, for disabling said key pad for use at least in making outgoing calls.

19. A radio telephone having a power source, a key pad, and a transceiver for bidirectionally coupling the radio telephone through RF links to a second transceiver, said radio telephone comprising:

a memory storing a plurality of records each having a plurality of fields, each record having a first field for storing a telephone number and a second field for storing an instruction associated with the telephone number stored in the first field;

a speed dialing sub-system coupled to said memory and having an input responsive to said key pad for selecting one of said records stored in said memory in accordance with input from said key pad, and for automatically dialing the telephone number stored in said first field of said selected record; and a radio telephone operation sub-system coupled to said memory, said radio telephone operation sub-system having an input coupled to said transceiver and being responsive to an incoming call that includes a telephone number of the caller for accessing said memory to search said stored records to locate a stored record having a telephone number stored in the first field that matches the telephone number of the caller, said radio telephone sub-system being responsive to a located stored record that has a telephone number stored in the first field, that matches the telephone number of the caller, and to the associated instruction, for decoupling at least a portion of said radio telephone from said power source.

20. A portable radio telephone including security means for remotely disabling the radio telephone, the security means comprising:

means responsive to a signal conveying a number identifying a source of an incoming telephone call;

memory means having at least one field for storing first data specifying a telephone number and an associated field for storing second data specifying a security instruction;

means for comparing the first data with the number identifying the source of the incoming telephone call; and control circuitry adapted, when the number identifying the source of the incoming call matches the first data, to respond by disabling the radio telephone in a manner dictated by the second data.

21. A radio telephone as in claim 20, wherein the security instruction causes power to at least a portion of the radio telephone to be switched off.

22. A radio telephone as in claim 20, wherein the security instruction causes at least a portion of a keypad of the radio telephone to be disabled.

23. A radio telephone having a user-interface and means coupled to said user interface for remotely controlling an operation of said user-interface, said controlling means comprising:

means responsive to a signal conveying a number identifying a source of an incoming call;

memory means having at least one numeric field for storing first data specifying a telephone number, and an associated field for storing second data specifying an instruction;

means for comparing the first data with the number identifying the source of the incoming call; and control circuitry adapted to respond, when the number identifying the source of the incoming call matches the first data, by modifying the operation of said user-interface in a manner dictated by the second data.

24. A radio telephone as set forth in claim 23, wherein the instruction causes power to be switched off to at least a portion of said radio telephone.

25. A radio telephone as set forth in claim 23, wherein the instruction causes at least a portion of said user-interface to be disabled.

* * * * *